(12) United States Patent
Oh

(10) Patent No.: US 7,528,513 B2
(45) Date of Patent: May 5, 2009

(54) SHAFT CURRENT CONTROL BRUSH ASSEMBLY WITH DRAINAGE

(75) Inventor: Hieyoung W. Oh, Bowdoin, ME (US)

(73) Assignee: Illinois Tool Works Inc., Glenview, IL (US)

(*) Notice: Subject to any disclaimer, the term of this patent is extended or adjusted under 35 U.S.C. 154(b) by 378 days.

(21) Appl. No.: 11/455,374

(22) Filed: Jun. 19, 2006

(65) Prior Publication Data

US 2007/0040459 A1    Feb. 22, 2007

Related U.S. Application Data

(60) Provisional application No. 60/709,021, filed on Aug. 17, 2005.

(51) Int. Cl.
*H02K 5/10* (2006.01)

(52) U.S. Cl. .................................................... 310/88
(58) Field of Classification Search .................. 310/88, 310/232, 239, 71; 361/220, 221, 222, 212
See application file for complete search history.

(56) References Cited

U.S. PATENT DOCUMENTS

| 4,499,390 | A  | * | 2/1985  | Iwaki et al. ............ 310/88 |
| 7,136,271 | B2 | * | 11/2006 | Oh et al. ............... 361/221 |
| 7,193,836 | B2 | * | 3/2007  | Oh et al. ............... 361/220 |

* cited by examiner

*Primary Examiner*—Chandrika Prasad
(74) *Attorney, Agent, or Firm*—Setter Roche LLP

(57) ABSTRACT

A shaft current control brush ring assembly includes a channel and a brush ring assembly secured within the channel. A drain is provided to direct liquids and contaminants away from said brush ring assembly.

14 Claims, 2 Drawing Sheets

SHAFT CURRENT CONTROL BRUSH ASSEMBLY WITH DRAINAGE

CROSS-REFERENCE TO RELATED APPLICATIONS

The present application claims the benefits of U.S. Provisional Application 60/709,021 filed Aug. 17, 2005

FIELD OF THE INVENTION

The present invention relates generally to grounding assemblies, and, more particularly, to grounding assemblies for motor shafts, turbine shafts and other rotating shafts conductively linked to components that create an electrical charge, or that may experience a build-up of electrical charge.

BACKGROUND OF THE INVENTION

Shaft induced electrical current is experienced in electric motors, and commonly in three-phase motors driven by variable speed drives. Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive, which increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistant path, sometimes through the ball bearings on the shaft, an instantaneous burst or discharge of electrical energy passes through the least resistant path. This discharge causes electric discharge machining (EDM), which can damage the surfaces of the bearing races and the balls in the bearing if the least resistant path is through the bearings. The electrical energy burst creates fusion craters, and particulate from the crater formation remains inside the sealed bearing. Both the fusion crater and the particulate material in the bearing act to disturb the free flow rotation of the bearing, which can lead to physical damage and premature bearing failure.

A number of mitigation technologies have been used in attempts to overcome this problem. Known attempts include using conductive bearing grease, insulating the bearings and using copper/phosphorus brushes and a Faraday shield. A common, somewhat cost-effective solution is to ground the shaft using spring-loaded copper brushes that provide a continuous flow of current to ground. Copper brushes can wear out rapidly, requiring frequent, periodic service and replacement. Additionally, oxide build-up on the shaft and other barriers between the brushes and the shaft reduce the current flow and cause a burst of electrical energy across the brush and shaft. Spring-loaded brushes also tend to vibrate due to alternating frictional relationships between the brush and the shaft surface. Vibration of the brushes, from whatever cause, can result in undesirable sparking.

The aforementioned related applications disclose grounding brushes that include conductive filaments in a holder surrounding the shaft. The brush can be used as a non-contacting ionizer to reduce the amount of electrical charges on the isolated shaft or on an isolated roller.

Still other types of grounding brush assemblies are known. When supplied as a continuous ring encircling a shaft, the grounding brush assembly can accumulate oil or other liquids around shaft. The accumulated liquid can interfere with the operation and performance of the grounding brush. The contaminants can migrate to bearings on the shaft and can cause damage or deteriorated performance. Removal of the assembly for periodic cleaning is time-consuming and may not be practical for substantially continuously operating equipment.

What is needed in the art is a grounding system that can be used effectively for a prolonged period of time, without accumulating oil or other liquids adjacent the shaft on which it is installed.

SUMMARY OF THE INVENTION

The present invention provides a grounding brush assembly with a drain for channeling liquids away from the assembly and the shaft on which the assembly is installed.

In one aspect thereof, the present invention provides a shaft current control brush ring assembly for a motor having a faceplate and a shaft. The assembly includes a channel having an outer band, an inner barrier and an outer barrier. A brush assembly is disposed in the channel and held between the inner barrier and the outer barrier. A drain associated with the outer barrier directs contaminants away from the brush assembly.

In another aspect thereof, the present invention provides a shaft current control brush ring assembly with a cylindrical band having an inwardly directed inner barrier at one end and an inwardly directed outer barrier at an opposite end defining an annular channel. A brush assembly is disposed in the channel and held between the inner barrier and the barrier. A contaminant chamber includes a substantially cylindrical outer ring associated with the outer barrier and an inwardly directed outer wall from the outer ring in opposed spaced relation to the outer barrier. A drain opening is provided in the outer wall.

In still another aspect thereof, the present invention provides an electric motor with a motor faceplate; a motor shaft extending outwardly of the faceplate and a shaft current control brush ring assembly encircling the shaft. The shaft current control brush ring assembly includes an inner barrier and an outer barrier in opposed spaced relation. The shaft extends through openings in the inner barrier and the outer barrier. A brush assembly is disposed between the inner barrier and the outer barrier; and a drain is associated with the outer barrier to direct contaminants away from the brush assembly.

An advantage of the present invention is providing an effective conductive brush assembly to reduce shaft current on rotating shafts without accumulating oils or other liquid contaminants that could interfere with operation and performance of the grounding assembly.

Another advantage of the present invention is providing a grounding assembly for electrical motor shafts that functions effectively for a prolonged period of time without service, maintenance or repair.

Still another advantage of the present invention is providing a conductive brush assembly that provides protection from contaminants for bearings near the assembly on a shaft on which the assembly and bearing are installed.

A still further advantage of the present invention is providing a drain for a grounding assembly on electric motors.

Other features and advantages of the invention will become apparent to those skilled in the art upon review of the following detailed description, claims and drawings in which like numerals are used to designate like features.

Figure 1:
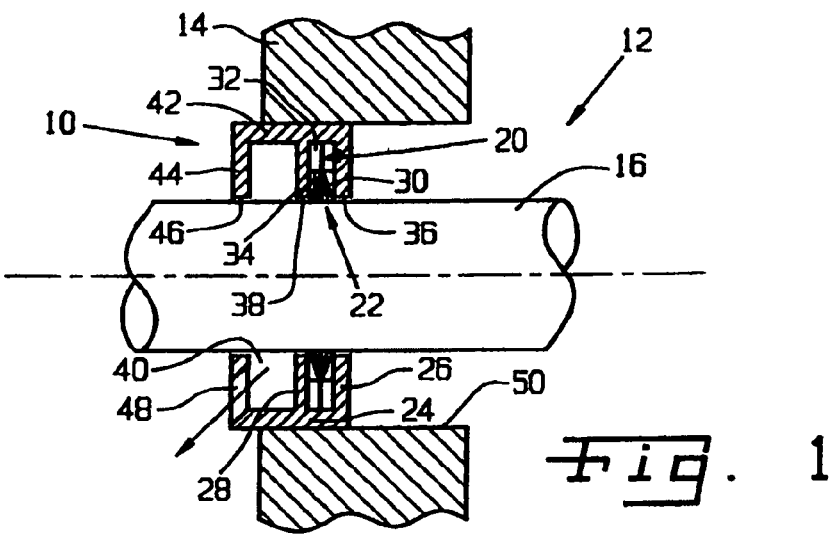
FIG. 1 is a fragmentary cross-sectional view of a motor having a shaft current control brush ring assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a shaft current control brush ring assembly in accordance with the present invention. Brush ring assembly 10 is installed on a motor 12 and specifically in a faceplate 14 of motor 12 for dissipating electrical charges that may build up on a shaft 16 of motor 12. It should be understood that brush ring assembly 10 can be provided in a variety of different sizes for use in motors of different types and on shafts 16 of different diameters.

Brush ring assembly 10 is of generally annular shape, encircling shaft 16. Brush ring assembly 10 is secured to faceplate 14 and is operatively arranged between shaft 16 and faceplate 14 to dissipate static or other charges that build on motor shaft 16 during operation of motor 12.

Brush ring assembly 10 includes an annular channel 20 and a brush assembly 22 disposed therein. Channel 20 includes a cylindrical outer band 24 with an inner barrier 26 and outer barrier 28 extending from band 24 toward shaft 16. Together, outer band 24, inner barrier 26 and outer barrier 28 form an annular shell or channel 20 in which brush assembly 22 is disposed. Channel 20 is made of conductive materials, such as metal including, but not limited to aluminum, stainless steel, bronze and copper Cannel 20 also can be made of conductive plastic.

Brush assembly 22 includes a plurality of individual fiber-like conductors 30 that may be arranged individually, in a substantially continuous annular ring or in bundles circumferentially around shaft 16. In one exemplary embodiment each conductor 30 is a fine, hair-like filament made from carbon fibers, stainless steel, conductive plastics such as acrylic or nylon fibers, or any other conductive fiber-type filament that can be provided with diameters sufficiently small to induce ionization when in the presence of an electrical field. In such embodiment, conductors 30 generally have diameters less than about 150 microns. In one arrangement, conductors 30 are conductive filaments having diameters within a range of about 5 microns to about 100 microns. Alternatively, conductors 30 can it be larger fibers of conductive material that are held in contact with shaft 16.

Conductors 30 are secured within channel 20 by an anchor structure 32 indicated generically by a rectangular box 32. Anchor structure 32 is electrically conductive and may be in the form of clamping structure such as plates between which conductors 30 are held. As yet another alternative, anchor structure 32 can be a conductive body of filler material such as conductive plastic, conductive adhesive or the like anchoring conductors 30 in channel 20 against band 24 and between inner barrier 26 and outer barrier 28. Distal end portions of conductors 30 extend past an inner surface 34 of anchor structure 32.

Inner barrier 26 and outer barrier 28 having central openings 36, 38, respectively, only minimally larger than the diameter of shaft 16. Accordingly, outer barrier 28 covers and protects conductors 30 from particulate ambient contaminants, and inner barrier 26 provides protection for bearings or the like inwardly on shaft 16 from assembly 10 in the event particulate matter passes through opening 38. To provide further protection, an annular contaminant chamber 40 is disposed outwardly of outer barrier 28. Contaminant chamber 40 is defined by an outer ring 42, which may be an extension of band 24, an outer wall 44 extending from ring 42 inwardly toward shaft 16, and outer barrier 28 in opposed, spaced relation to outer wall 44. Outer wall 44 defines an opening 46 allowing shaft 16 to rotate therein. A drain hole 48 is provided along a lower portion of outer wall 44 so that liquids such as oil, water moisture and the like, as well as fine contaminants of other type can pass from contaminant chamber 40.

Faceplate 14 includes a precisely machined recess 50 therein of appropriate diameter to receive channel 20 in a press-fit arrangement. Brush assembly 22 is pre-installed in channel 20. The completed assembly of brush ring assembly 10 is pressed into recess 50 and held therein by an interference fit relationship. Accurate machining of recess 50 facilitates accurate, optimal positioning of conductors 30 relative to shaft 16 for optimal performance of shaft current control brush ring assembly 10. Channel 20 can be tapered or chamfered at the junction of inner barrier 26 and outer band 24 to facilitate insertion of channel 20 into recess 50.

When installed, conductors 30 can be in direct contact with shaft 16 as a grounding brush, for direct transfer of electrical charge from shaft 16 to brush ring assembly 10. Alternatively, conductors 30 can be minimally spaced from shaft 16 such that, as an electrical field is generated by charges building on shaft 16, an ionized field is created, allowing indirect transfer of charges from shaft 16 to conductors 30. In still another suitable arrangement, fine, lightweight conductors 30 are used in sufficient length to be in contact with shaft 16 when motor 10 is at rest or is operating at slow speeds. As the speed of shaft 16 increases during startup and use, air currents move conductors 30 away from shaft 16. Eliminating or reducing the time period of frictional contact between conductors 30 and shaft 16 reduces wear and prolongs the life of conductors 30. Faceplate 14 is electrically connected to ground, and charges building on shaft 16 are dissipated to ground through brush ring assembly 10 before arcing can occur.

Liquid passing through opening 46 defined between shaft 16 and outer wall 44 is flung outwardly in contaminant chamber 40 due to the rotation of shaft 16. Chamber 40 provides a stilling zone in which the fine mist particles can coalesce and accumulate for drainage removal through drain hole 48.

Figure 2:
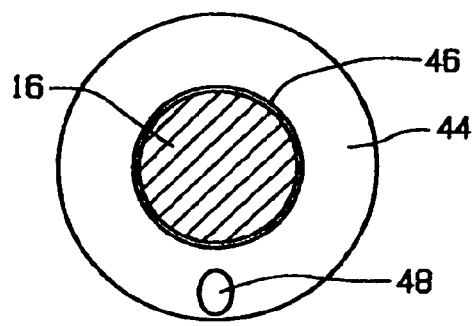
FIG. 2 is a cross-sectional end view of the motor shaft and brush ring assembly shown in FIG. 1.
Figure 3:
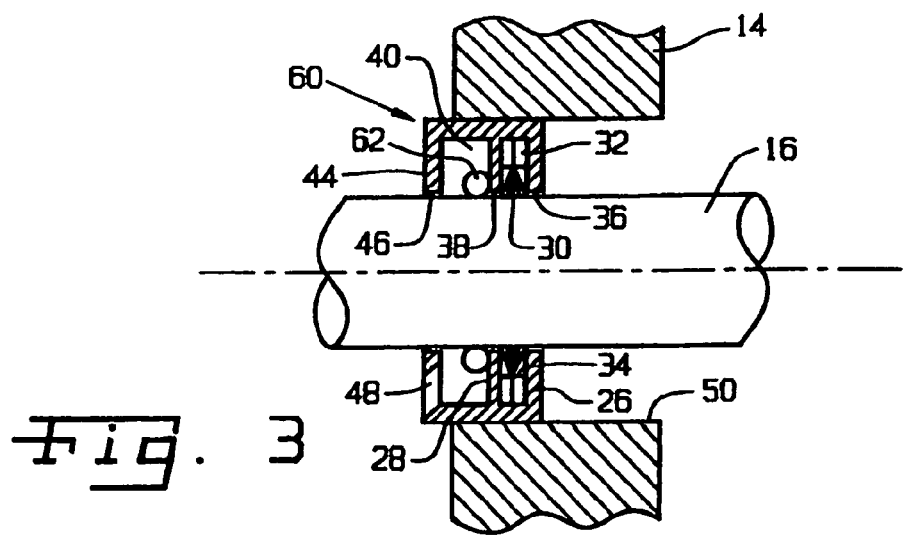
FIG. 3 is a cross-sectional view of a motor having a shaft current control brush ring assembly in accordance with a second embodiment of the present invention.
Figure 5:
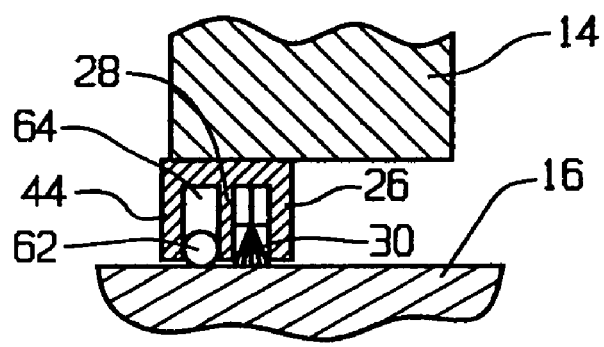
FIG. 5 is a cross-sectional view of a motor having a shaft current control brush ring assembly in accordance with still another embodiment of the present invention.

FIG. 3 illustrates another embodiment of the present invention for a brush ring assembly 60 which is similar to the embodiment of brush ring assembly 10 shown in FIGS. 1 and 2. Corresponding structure in assembly 60 has been designated with the same reference numeral as the similar structure in assembly 10. A shaft seal in the nature of an n O-ring 62 is disposed on shaft 16 in chamber 40 adjacent outer barrier 28. O-ring 62 rotates with shaft 16. Material near to or contacting O-ring 62 will be thrown outwardly by centrifugal force for accumulation in chamber 40. O-ring 62 provides improved sealing around shaft 16, further inhibiting passage of liquids or other contaminants through opening 38, thereby providing improved protection for conductors 30. Alternatively, O-ring 62 can be disposed against outer wall 44. As yet another alternative illustrated in FIG. 5, O-ring 62 can be provided in a narrow chamber 64 such that O-ring 62 provides a sliding seal against both outer barrier 28 and outer wall 44.

Figure 4:
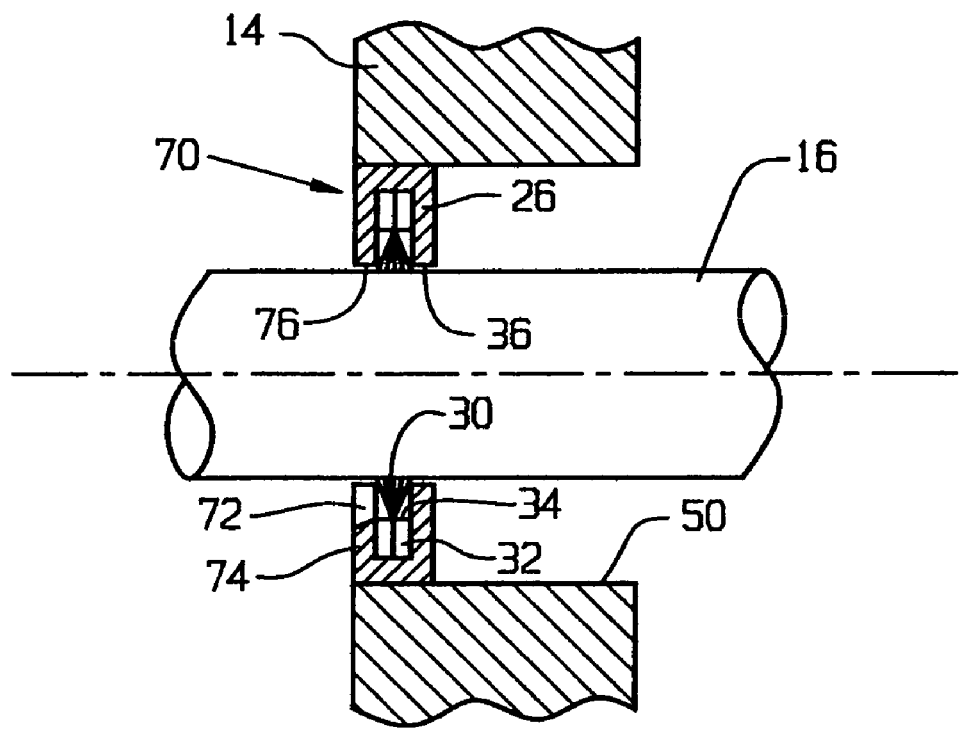
FIG. 4 is a cross-sectional view of a motor having a shaft current control brush ring assembly in accordance with yet another embodiment of the present invention.

FIG. 4 illustrates yet another embodiment of the present invention for a brush ring assembly 70. A drainage hole 72 is provided in outer barrier 74, and no separate contaminant chamber is provided. Drainage hole 72 and extends from an opening 76 in outer barrier 74 a sufficient distance to accept flow from inner diameter surface 34 of anchor structure 32. Brush ring assembly 70 can be used advantageously for installations in which axial space is limited on shaft 16, with insufficient space available for a dedicated contaminant chamber.

The accumulator and drainage concepts shown and described herein can be used for installations other than grounding brush assemblies. For example, a drain and contaminant chamber can be used in association with a bearing for directing contaminants away from the bearing even without the use of a grounding brush assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A shaft current control brush ring assembly for a motor having a faceplate and a shaft, said assembly comprising:
   a channel having an outer band, an inner barrier and an outer barrier;
   a brush assembly disposed in said channel and held between said inner barrier and said outer barrier;
   a drain associated with said outer barrier to direct contaminants away from said brush assembly;
   a contaminant chamber outward of said outer barrier and defined between said outer barrier, an outer wall in opposed spaced relation to said outer barrier and an outer ring between said outer barrier and said outer wall, said chamber having a drain opening therefrom, said drain opening disposed through said outer wall, said chamber further including a shaft seal.

2. The shaft current control brush ring assembly of claim 1, said shaft seal disposed against said outer barrier.

3. The shaft current control brush ring assembly of claim 1, said shaft seal disposed against said outer wall.

4. The shaft current control brush ring assembly of claim 1, said shaft seal disposed against said outer barrier and against said outer wall.

5. The shaft current control brush ring assembly of claim 1, said drain including a drain opening in said outer barrier.

6. A shaft current control brush ring assembly comprising: a cylindrical band having an inwardly directed inner barrier at one end and an inwardly directed outer barrier at an opposite end defining an annular channel; a brush assembly disposed in said channel and held between said inner barrier and said barrier; a contaminant chamber including a substantially cylindrical outer ring associated with said outer barrier and an inwardly directed outer wall from said outer ring in opposed spaced relation to said outer barrier; and a drain opening in said outer wall.

7. The assembly of claim 6, including an O-ring in said chamber.

8. The assembly of claim 7, said O-ring disposed against said outer barrier.

9. The assembly of claim 7, said O-ring disposed against said outer wall.

10. The assembly of claim 7, said O-ring disposed against said outer barrier and against said outer wall.

11. An electric motor comprising:
    a motor faceplate;
    a motor shaft extending outwardly of said faceplate;
    a shaft current control brush ring assembly encircling said shaft, said shaft current control brush ring assembly including: an inner barrier and an outer barrier in opposed spaced relation defining an annular channel, fibers secured in said channel by an anchor structure between said inner and outer barriers, said anchor structure having an inner surface, said shaft extending through openings in said inner barrier and said outer barrier;
    a brush assembly disposed between said inner barrier and said outer barrier; and
    a drain associated with said outer barrier to direct contaminants away from said brush assembly, said drain comprising a drain hole in said outer barrier, said drain hole exposing a portion of said inner surface of said anchor structure.

12. The motor of claim 11, including a chamber outwardly out said outer barrier, said chamber including an outer wall encircling said shaft, said outer wall having a drain opening therethrough.

13. The motor of claim 12, including a seal on said shaft in said chamber.

14. The motor of claim 13, said outer wall in opposed spaced relation to said outer barrier, and said seal being in sliding seal relationship with at least one of said outer barrier and said outer wall.

* * * * *